US005668969A

United States Patent [19]
Fitch

[11] Patent Number: 5,668,969
[45] Date of Patent: *Sep. 16, 1997

[54] ADDRESS SELECTIVE EMULATION ROUTINE POINTER ADDRESS MAPPING SYSTEM

[75] Inventor: Jonathan Fitch, Cupertino, Calif.

[73] Assignee: Apple Computer, Inc., Cupertino, Calif.

[*] Notice: The term of this patent shall not extend beyond the expiration date of Pat. No. 5,392,408.

[21] Appl. No.: 311,880

[22] Filed: Sep. 26, 1994

Related U.S. Application Data

[63] Continuation of Ser. No. 124,302, Sep. 20, 1993, Pat. No. 5,392,408.
[51] Int. Cl.⁶ .................................................. G06F 12/10
[52] U.S. Cl. ............................ 711/202; 711/3; 711/206
[58] Field of Search .................................... 395/412, 416, 395/413, 421.01, 421.04, 452, 450, 403, 375, 500

[56] References Cited

U.S. PATENT DOCUMENTS

| | | | |
|---|---|---|---|
| 3,698,007 | 10/1972 | Malcolm et al. | |
| 5,255,384 | 10/1993 | Sachs et al. | 395/417 |
| 5,392,408 | 2/1995 | Fitch | 395/403 |

FOREIGN PATENT DOCUMENTS

| | | |
|---|---|---|
| 0272198 | 6/1988 | European Pat. Off. |
| 0464494 | 1/1992 | European Pat. Off. |
| 58-83377 | 5/1983 | Japan . |
| 4205154 | 7/1992 | Japan . |
| 5028040 | 2/1993 | Japan . |
| 8807718 | 10/1988 | WIPO . |

OTHER PUBLICATIONS

McBride, M., "Microprogrammable Chip Set Emulates Mainfraime Processing", Electronic Design, Aug. 1984, pp. 229-234, 236, 238, 240.

"High Performance Dual Architecture Processor", IBM Technical Disclosure Bulletin, Feb. 1993, pp. 231-234.

*Primary Examiner*—Jack B. Harvey
*Assistant Examiner*—Ario Etienne
*Attorney, Agent, or Firm*—Fenwick & West, LLP

[57] ABSTRACT

An address selective address mapping system comprises an address translation circuit, a central processing unit (CPU), a data cache, and a memory. The address outputs of the CPU are coupled to a first address bus, while the address inputs of the data cache and memory are coupled to a second address bus. The address translation circuit's inputs are coupled to the first address bus, and the address translation circuit's outputs are coupled to the second address bus. The CPU sends a pointer address via the first address bus to the address translation circuit. The address translation circuit determines whether the pointer address indicates that the next source instruction is within the subset of the most frequently executed source instructions. If so, the address translation circuit maps the pointer address to an address within the data cache. If not, the pointer address is routed through the address translation circuit unchanged. The pointer address is next routed to the data cache and to the RAM via the second address bus. If the pointer address was mapped to a data cache address, the data cache outputs the pointer to the next emulation routine on the data bus. If the pointer address was not mapped to a data cache address, the pointer to the next emulation routine is output to the data bus at the data outputs of the memory. The present invention also includes a method for manufacturing an address selective address mapping system.

14 Claims, 7 Drawing Sheets

ADDRESS SELECTIVE EMULATION ROUTINE POINTER ADDRESS MAPPING SYSTEM

This is a continuation of application Ser. No. 08/124,302, filed on Sep. 20, 1993, now U.S. Pat. No. 5,392,408.

BACKGROUND OF THE INVENTION

1. Field of the Invention

The present invention relates generally to computer instruction emulation, and more particularly, to a system for performing an instruction mapping. Still more particularly, the present invention is a system for mapping a plurality of bits within a source instruction to a cache address corresponding to an emulation routine address, and a method for manufacturing the system.

2. Description of Related Art

Microprocessors execute machine instructions that result in specific changes of state within the microprocessor hardware. A collection of such instructions, when properly arranged, is known as a program. Execution of a program's instructions in sequence performs a series of state changes that results in useful work, such as adding a column of figures.

Many computer architectures exist, each of which understands a specific and typically unique set of machine instructions or "language." Therefore, a program written for one architecture is useless and incomprehensible to another architecture. Since programs can require a tremendous investment of time and resources to write (hundreds of man years of skilled labor in some cases), and are limited to a single architecture, it is desirable to have a means to translate the program from one language to another. Such a translator would allow the investment made in writing programs for one architecture to be retained for writing the same program on other architectures.

Three broad solutions to the problem of architecture-specific program execution exist. These are static recompilation, dynamic recompilation, and interpretive emulation. In each case, an emulation program is written, usually on the alternative or host architecture, that translates a sequence of source program instructions intended for the source or emulated architecture into one or more instructions in the host's instruction language that perform the same function. The emulation program can be written to simulate the actions of each source program instruction individually, or to simulate the actions of several source program instructions in a single step. In general, simulation of each source program instruction individually provides greater emulation accuracy at the expense of execution speed.

In static recompilation, the emulated program is swept through in its entirety prior to execution and translated to a host program. The host program is then executed. This is rarely a complete solution since most programs exhibit dynamic behavior that cannot be predicted statically. For example, a branch instruction may depend upon a result computed by previous instructions that cannot be predicted prior to running the program. Therefore, the branch instruction cannot be translated to its meaningful counterparts in the host's language. Static recompilation also suffers from the shortcoming of requiring significant amounts of memory to store the translated copy of the program. In addition, static recompilation requires a complete understanding of the behavior of all possible programs. Thus, static recompilation is not a complete solution to effectively translating computer programs for emulation.

Dynamic recompilation allows emulation of programs that exhibit dynamic behavior such as branch instructions. In dynamic recompilation, programs are statically translated until a problem instruction (usually a branch) that cannot be accurately translated is reached. The translated program is then executed up to this point such that the architectural state of the emulated machine is updated. The problem instruction can then be emulated by the execution of an emulation routine corresponding to the problem instruction, after which static translation can begin again. This method can successfully emulate any program and is efficient if large sections of source instructions can be statically translated. However, the translator must run concurrently with the emulated program, and adds significant overhead to the emulation process. The speed and memory requirements are difficult to predict, and will vary greatly depending upon the character of the emulated program.

Interpretive emulation emulates each source instruction as a separate entity. Interpretive emulation provides an architecturally distinct state at each emulated source instruction boundary, and has the potential of being the most accurate and interactive of the three emulation techniques. Interpretive emulation typically has a predictable and potentially small memory requirement, since no translated copy of the program need be stored. However, interpretive emulation can be the slowest method, requiring many more host instructions to emulate a given source instruction as compared to either static or dynamic recompilation.

Interpretive emulation is the most desirable emulation technique in terms of emulation accuracy and robust performance; unfortunately, it is typically the slowest emulation technique. The most straightforward method of implementing an interpretive emulator is to employ a dispatch loop within the emulator to fetch a source instruction from the source program stream, and to use the binary value of the operation code within the source instruction to index a table in memory. The value of the table entry, referred to here as a "pointer," is the address of an emulation routine consisting of host instructions that implement the architectural changes of state required to emulate the original source instruction. The dispatch loop issues a jump to the address indicated by the pointer, after which the emulation routine is executed. The final host instruction within the emulation routine returns control to the dispatch loop, which fetches the next source instruction from the source program.

The prior art implementation suffers from a major performance problem. The performance problem arises from the fact that the host instruction references are in a pattern that is very different than that found in normal, non-emulated programs, and for which most microprocessors are poorly suited. Careful study of typical program behavior has shown that most programs exhibit great address coherence. In particular, the instruction most likely to execute next is the next instruction in sequence. Loops also execute frequently, so an instruction sequence that has just executed is likely to execute again. As a result of such study, modern microprocessors are designed to utilize cache memories. Caches are designed to exploit address coherence behavior by fetching instruction sequences prior to their use (e.g. burst operations) and by providing efficient access to instructions within close address proximity. If instructions are referenced that are not in the cache, particularly in reduced instruction set computing (RISC) architectures, the time required to fetch and execute the instruction can increase by 20 times or more. Moreover, in a pipelined operation, instructions that are outside the cache can cause the pipeline to stall. While the source instructions within the source instruction program are in a pattern corresponding to typical program behavior and are therefore likely to exhibit address coherence, the emulation routines corresponding to the source instructions have no address coherence. This in turn means that the host instruction references from one emulation routine to another have no address coherence. Since the host instruction references in an interpretive emulation environment are not in a pattern resembling typical program behavior, the performance of the prior art interpretive emulator does not benefit from the use of a cache.

A prior art attempt at improving the performance of an interpretive emulator is found in an emulator produced by Insignia Solutions, Inc. The Insignia emulator maintains statistics indicating a number of times a given loop within a source instruction program has been executed. If the loop has been executed more than a predetermined number of times, the Insignia emulator assumes that the loop will be executed again. In this case, the emulator stops the emulation, and translates the source instructions of the loop into a series of host instructions that can be executed directly, after which emulation continues. If the emulator subsequently detects that the source instruction program is entering the given loop, the series of host instructions emulating the loop will be executed. While this approach toward enhancing the performance of an interpretive emulator functions well for frequently executed loops, the approach does not result in any improvement for loops that are infrequently executed. Moreover, the Insignia Solutions, Inc. emulator also does not address performance enhancement for the emulation of individual source instructions, and requires additional overhead for identifying loops and tracking their use.

What is needed is a means for implementing interpretive emulation where a standard cache organization can be used efficiently without the performance problems of the prior art.

SUMMARY OF THE INVENTION

The present invention is an instruction mapping system and a method for manufacturing the instruction mapping system. The system of the present invention preferably comprises: an instruction mapping circuit having a plurality of address inputs, and a plurality of outputs; a central processing unit (CPU) having a plurality of control outputs, a plurality of address outputs, and a plurality of data inputs; a data cache having a plurality of control inputs, a plurality of address inputs, a cache miss output, a plurality of data inputs, and a plurality of data outputs; and a random access memory (RAM) having a plurality of control inputs, a plurality of address inputs, an enable input, a plurality of data inputs, and a plurality of data outputs. The plurality of address outputs of the CPU, are coupled to a first address bus, while the plurality of address inputs of the data cache and the plurality of address inputs of the RAM are coupled to a second address bus. The instruction mapping circuit's plurality of address inputs are coupled to the first address bus, and the instruction mapping circuit's plurality of outputs are coupled to the second address bus. The plurality of control outputs of the CPU, the plurality of control inputs of the data cache, and the plurality of control inputs of the RAM are coupled to a control bus. Similarly, the data inputs of the CPU, the data inputs and data outputs of RAM, and the data inputs and data outputs of the data cache are coupled to a data bus. The cache miss output of the data cache is coupled to the enable input of the RAM.

Source instructions in a source instruction program are loaded from RAM and stored in the data cache based upon the assumption of address coherence in the source instruction program. The present invention identifies a subset of the most frequently executed source instructions within the source instruction set. For each of the source instructions within the subset, the present invention maintains in the data cache a pointer to a corresponding emulation routine. Thus, the data cache maintains a set of pointers to the emulation routines that have the highest probability of being executed.

In the operation of the system of the present invention, the CPU retrieves the next source instruction to be emulated from either the data cache or the RAM. The CPU then extracts a plurality of opcode bits from the next source instruction, and operates upon the opcode bits to produce a pointer address. The pointer stored at the pointer address indicates the address of the next source instruction's emulation routine. The CPU then sends the pointer address via the first address bus to the instruction mapping circuit. The instruction mapping circuit determines whether the pointer address indicates that the next source instruction is within the subset of most frequently executed source instructions. If so, the instruction mapping circuit maps the pointer address to an address within the data cache. If the pointer address indicates that the next source instruction is not within the subset of most frequently executed source instructions, the pointer address is routed through the instruction mapping circuit unchanged. The pointer address is next routed to the data cache and to the RAM via the second address bus. If the pointer address was mapped to a data cache address, the data cache outputs the pointer to the next emulation routine on the data bus. If the pointer address was not mapped to a data cache address, the next source instruction is not a member of the subset of most frequently executed source instructions, and the pointer to the next emulation routine is output on the data bus at the plurality of data outputs of the RAM. Since most of the source instructions within the source instruction program will be members of the subset, the pointer to the next emulation routine is typically present in the data cache rather than in RAM. This greatly reduces the time required for the pointer to the next emulation routine to be returned to the interpretive emulator's dispatch loop. Therefore, the instruction mapping system of the present invention significantly enhances the performance of the emulator while using a standard cache organization.

The present invention also includes a method for manufacturing an instruction mapping system. The preferred method of manufacturing the instruction mapping system comprises the steps of: executing one or more source instruction programs; collecting statistics indicating the relative frequency of execution for each source instruction within each program; determining a subset of most-frequently executed source instructions within the source instruction set; assigning to each instruction within the subset a cache address, the cache address containing a pointer to an appropriate emulation routine; and programming a programmable logic means within the instruction mapping circuit such that source instructions within the subset of most frequently executed source instructions are mapped to the appropriate pointer cache address.

DETAILED DESCRIPTION OF THE PREFERRED EMBODIMENTS

Prior art interpretive emulators exhibit behavior contrary to the assumption of address coherence. The dispatch loop relies upon a pointer to an emulation routine address for each source instruction to be emulated. While the source instructions are referenced in sequence, the emulation routines and hence the pointers to the emulation routines are referenced based upon the mix of source instruction types and their corresponding binary coding, most usefully thought of as randomly distributed. The collection of all emulation routine pointers is stored in a table in memory. Simply pre-fetching and storing in the cache a plurality of pointers whose addresses precede and follow a pointer to a currently-executing emulation routine does not exploit address coherence, since emulation routines are unlikely to be executed in sequential order. A pointer to an emulation routine therefore has no address coherence relationship to other pointers surrounding it. Thus, the cache space is poorly utilized. Burst operations in this case occupy a cache bus for unneeded data. When emulating a rich instruction set such as those found in complex instruction set computing (CISC) architectures, the memory tables containing pointers to the emulation routines are particularly large, commonly referencing approximately 64,000 source instruction emulation routines. This serves to aggravate the problem, as standard cache memories are capable of storing only a fraction of such large pointer tables. The overall result is greatly reduced performance over what might be expected if the emulator behaved like normal programs.

Several studies have been performed indicating that within any given instruction set, some instructions are used more often than others. It has been discovered that within a CISC instruction set having approximately 64,000 instructions, a subset of approximately 2,000 instructions represented greater than 95% of the instructions executed. In other words, the instruction set was sparsely used. The instructions within the subset were essentially randomly distributed throughout the 64,000 instruction binary opcode space. Furthermore, the particular subset was largely common across a large sampling of application programs. This behavior is due to programming conventions which enforce limits on register usage, and subroutine calling conventions. In addition, compilers tend to produce common and repetitive sequences of machine instructions for frequently used high level language constructs, further contributing to this effect.

In light of the above information, the instruction subset can be viewed as having an execution coherence. That is, the instruction that is most likely to execute after a given instruction is one within the subset. Current cache organizations are not designed on the basis of execution coherence, but rather on the basis of address coherence.

The instruction mapping system of the present invention recognizes whether a given source instruction lies within a subset of most frequently executed source instructions within the source instruction set. A set of emulation routine pointers corresponding to those source instructions within the subset is maintained in a cache. Hence, the pointer that is most likely to be referenced following a given pointer is present within the cache, thereby linking the cache contents to the execution coherence of the source instruction set. When a next source instruction to be emulated is a member of the subset, the instruction mapping system ensures that the pointer to the next emulation routine is fetched from the cache instead of from memory. This greatly reduces the time required to return the pointer to the next emulation routine to the interpretive emulator's dispatch loop. Thus, the instruction mapping system of the present invention enhances the emulator's performance while using a standard cache organization.

Figure 1:
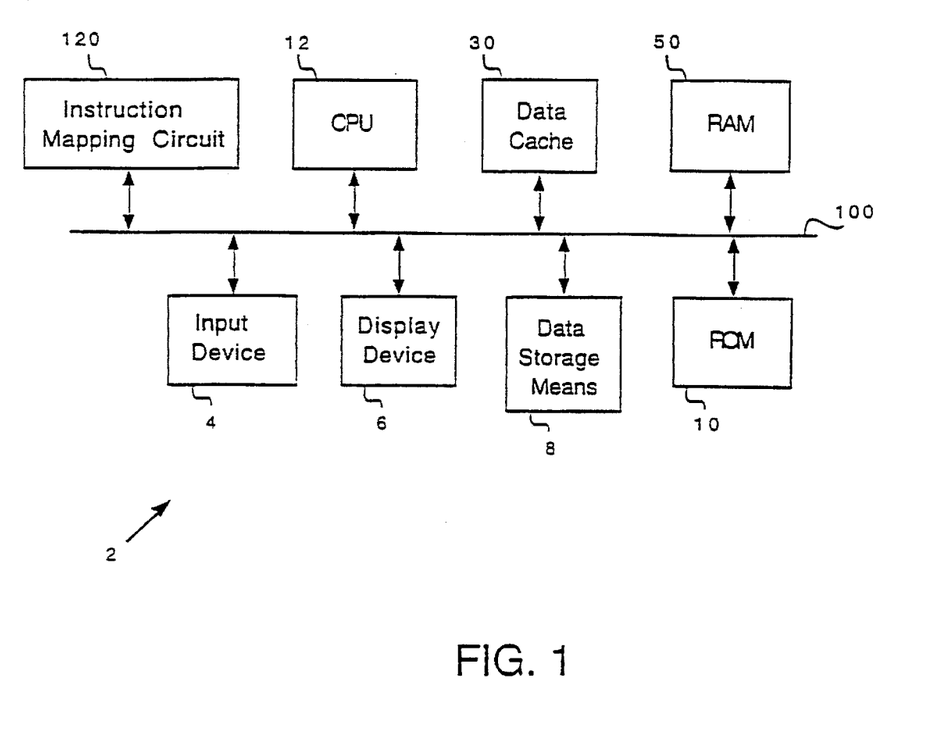
FIG. 1 is a block diagram of a first and preferred embodiment of an instruction mapping system constructed in accordance with the present invention.

Referring now to FIG. 1, a block diagram of a first and preferred embodiment of the instruction mapping system 2 constructed in accordance with the present invention is shown. The instruction mapping system 2 comprises a CPU 12, a data cache 30, a random access memory (RAM) 50, an instruction mapping circuit 120, a read-only memory (ROM) 10, an input device 4 such as a keyboard, a display or output device 6, and a data storage means 8 such as a hard disk drive. Each element within the instruction mapping system 2 is preferably coupled to a common bus 100 in a Von Neumann architecture, where the common bus 100 comprises a control bus 102, a first address bus 104, a second address bus 105, and a data bus 106. In an exemplary embodiment, the instruction mapping system includes a Motorola 88000 RISC CPU, a Motorola 88200 16-kilobyte cache memory, 8 megabytes of RAM memory, a keyboard, a color monitor, and an 80 megabyte hard disk drive. The buses 102, 104, 105 and 106 comprising the common bus 100 are preferably each 32 bits wide in the exemplary embodiment. While a RISC CPU is used in the exemplary embodiment, this is not a requirement as the present invention applies equally well to other CPU types.

Figure 2:
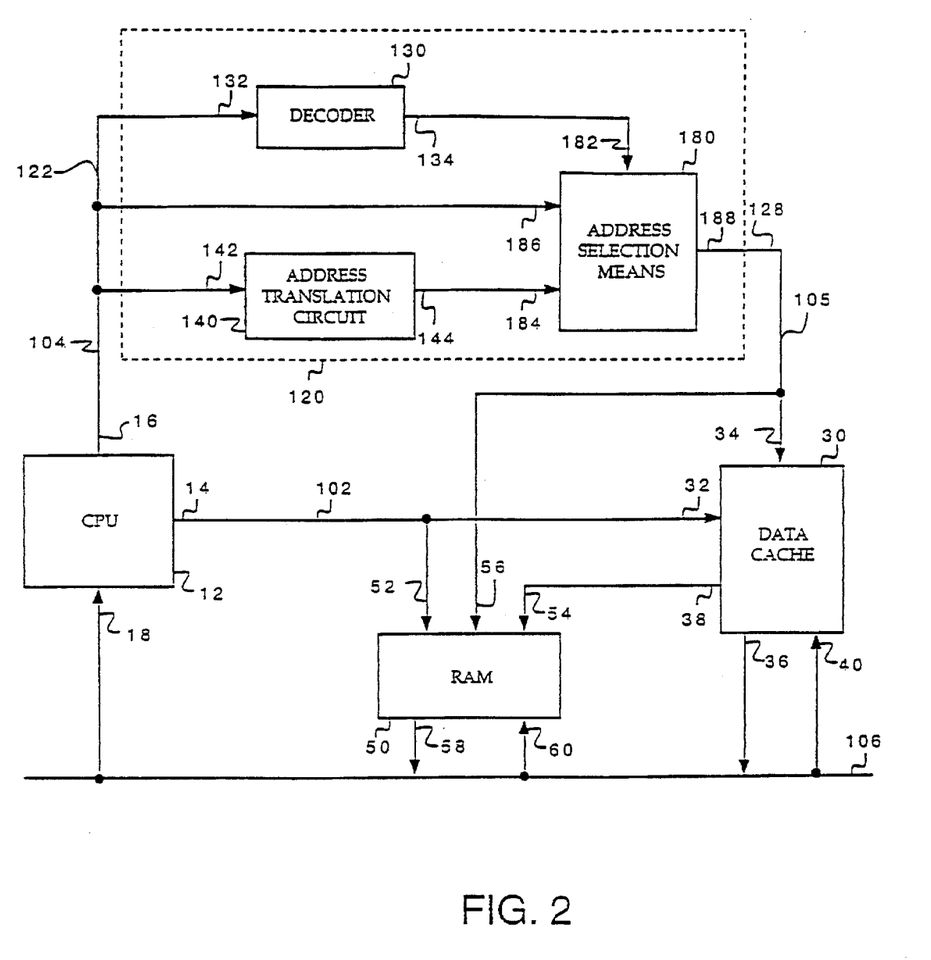
FIG. 2 is a block diagram showing further details of the preferred embodiment of an instruction mapping circuit of the present invention.

Referring also now to FIG. 2, a block diagram showing further details of the preferred embodiment of the instruction mapping circuit 120 is shown. The CPU 12 comprises a microprocessor having a plurality of control outputs 14, a plurality of address outputs 16, and a plurality of data inputs 18. The control outputs 14 are coupled to the control bus 102, the address outputs 16 are coupled to the first address bus 104, and the data inputs 16 are coupled to the data bus 106. The couplings to each of these buses 102, 104 and 106 allow the CPU 12 to direct the activities of the instruction mapping system 2 by issuing control commands, specifying addresses, and operating upon data received from RAM 50 and the data cache 30.

The RAM 50 preferably comprises a memory having a plurality of control inputs 52, an enable input 54, a plurality of address inputs 56, a plurality of data outputs 58, and a plurality of data inputs 60. The control inputs 52 are coupled to the control bus 102, the address inputs 56 are coupled to the second address bus 105, the data outputs 58 and data inputs 60 are coupled to the data bus 106. The RAM 50 stores the source instruction program and those pointers to emulation routines that are not in the subset of the most frequently executed source instructions. In response to an appropriate RAM control signal received at the control inputs 52, the RAM 50 outputs data to its data outputs 58 or loads data present at its data inputs 60. The address associated with the data transfer is specified in an address present upon the second address bus 105 and received at the RAM address inputs 56. The enable input 54 of the RAM 50 prevents the RAM 50 from transferring a targeted data item to the data bus 106 if the targeted data item is present within the data cache 30.

The data cache 30 preferably comprises a high-speed memory having a plurality of control inputs 32, a plurality of address inputs 34, a plurality of data outputs 36, a cache miss output 38, and a plurality of data inputs 40. In a manner similar to the RAM 50, the control inputs 32 of the data cache 30 are coupled to the control bus 102, the address inputs 34 of the data cache 30 are coupled to the second address bus 105, and the data outputs 36 and data inputs 40 of the data cache 30 are coupled to the data bus 106. The cache miss output 38 is coupled to the enable input 54 of the RAM 50. As in the case of the RAM 50, the data cache 30 outputs data to its of data outputs 36 or loads data present at its data inputs 40 in response to an appropriate control signal received at the data cache's control inputs 32. The address associated with the data transfer is specified in an address signal present upon the second address bus 105 and received at the data cache address inputs 34. In a data read operation, if the address specified by the address signal is present in the data cache, the data stored at the address is output to the data outputs 36, thereby transferring the data to the data bus 106. If the targeted address is not found in the data cache 30, the data cache 30 outputs a cache miss signal at its cache miss output 38. In this case, the data item is located in RAM 50. The cache miss signal allows the RAM 50 to transfer the data item to the data bus 106. The cache 30 preferably has a reserved block of addresses for storing pointers to the emulation routines for the subset of the most frequently executed source instructions. The reserved block preferably has a predefined base address from which the pointers to the most used emulation routines can be indexed. In an exemplary embodiment, this reserved block has about 2000 addresses to store the 2000 instructions that are executed 90% of the time.

The instruction mapping circuit 120 has a plurality of address inputs 122 and a plurality of address outputs 128. The address inputs 122 are coupled to the first address bus 104, and the address outputs 128 of the instruction mapping circuit 120 are coupled to the second address bus 105. The instruction mapping circuit 120 tests three conditions based upon an address signal received at its address inputs 122 from the first address bus 104. First, if the address signal has no correspondence to a CPU request for the pointer to the next emulation routine, the instruction mapping circuit 120 routes the address signal to the second address bus 105 unchanged. Second, if the address signal does correspond to a CPU request for the pointer to the next emulation routine, the instruction mapping circuit 120 determines if the signal has been derived from a source instruction within the subset of most frequently executed source instructions. If not, the address signal is routed to the second address bus 105 unchanged. Third, if the address signal was derived from a source instruction within the subset, the instruction mapping circuit 120 maps the address signal to a predefined data cache 30 address. This predefined data cache 30 address contains the pointer to the next emulation routine.

The instruction mapping circuit 120 preferably comprises a decoder 130, an address translation circuit 140, and an address selection means 180. The decoder 130 comprises combinational logic having a plurality of inputs 132 and an output 134. The decoder inputs 132 are coupled to the address input 122 of the instruction mapping circuit 120. The decoder 130 receives the address signal, and determines whether the address signal was derived from one of the source instructions. In other words, the decoder 130 determines if the address signal corresponds to an address for an emulation pointer. If so, the decoder outputs an acknowledgment signal at its output 134.

The address translation circuit 140 comprises combinational logic having a plurality of translation inputs 142 and a plurality of translation outputs 144. The translation inputs 142 are coupled to the address inputs 122 of the instruction mapping circuit 120. The address translation circuit 140 receives the address signal at its translation inputs 142, and determines if the address signal was derived from a source instruction within the subset of most frequently executed source instructions. If so, the address translation circuit 140 alters a subset of bits within the address signal to correspond to a predefined data cache address. If the address signal received was not derived from a source instruction within the subset the address translation circuit 140 routes the address signal to its outputs 144 unaltered.

The address selection means 180 preferably comprises one or more multiplexors, and has a control input 182, a plurality of first inputs 184, a plurality of second inputs 186, and a plurality of outputs 188. The control input 182 is coupled to the output 134 of the decoder 130, the first inputs 184 are coupled to the translation outputs 144, and the second inputs 186 are coupled to the address inputs 122 of the instruction mapping circuit 120. The outputs 188 of the address selection means 180 form the instruction mapping circuit outputs 128. The address selection means 180 routes either the signal present at its first inputs 184 or the signal present at its second inputs 186 to its outputs 188 based upon the value of the signal present at its control input 182. The control input 182 receives the acknowledgment signal from the decoder 130. If the acknowledgment signal is not received, the address selection means 180 routes the address signal present at the instruction mapping circuit's address inputs 122 to the outputs 188 and onto the second address bus 105. If the address selection means 180 receives the acknowledgment signal, the signal present at the address translation circuit's outputs 144 are routed to the second address bus 105 in like manner.

In an interpretive emulation environment, an emulation routine is executed, a next source instruction is fetched from memory, and a pointer to a next emulation routine is fetched from memory. Once the pointer to the next emulation routine is available, the next emulation routine can be accessed and executed. The pointer to the next emulation routine is derived from the next source instruction. During the execution of a current emulation routine, the CPU 12 outputs an address signal at its address outputs 16, thereby placing the address signal upon the first address bus 104. If the address signal simply indicates the address of data being fetched for calculations related to the current emulation routine, the address signal passes through the instruction mapping circuit 120 unaltered. After the current emulation routine has completed its execution, the interpretive emulator directs the CPU 12 to fetch the next source instruction from memory. In the preferred embodiment of the instruction mapping system 2, groups of source instructions having an address coherence relationship with a currently executing or recently executed source instructions are stored in the data cache 30. Thus, the next source instruction is typically retrieved from the data cache 30 rather than from RAM 50 in the preferred embodiment. Each source instruction comprises an opcode portion and a data portion. On a computer system capable of executing source instructions directly, the opcode portion corresponds to a microprogram that carries out the actions required to implement the source instruction. The CPU 12 extracts the opcode portion from the next source instruction, and performs one or more operations upon the opcode portion to create a pointer address signal corresponding to an address within RAM 50. The operations required are typically a logical masking step followed by one or more shifts. The CPU 12 next outputs the pointer address signal at its address outputs 16 onto the first address bus 104. Thus, the address signal present upon the first address bus 104 is the pointer address signal in this case.

The inputs 132 of the decoder 130, the translation inputs 142 of the address translation circuit 140, and the first inputs 184 of the address selection means 180 each receive the address signal. Since the address signal was derived from one of the source instructions, the decoder 130 generates the acknowledgment signal at the output 134. If the source instruction from which the address signal was derived is a member of the subset of most frequently executed source instructions, the address translation circuit 140 maps the address signal to a predefined data cache address, outputting a mapped pointer address signal at its translation outputs 144. The predefined data cache 30 address contains the pointer to the next emulation routine. If the address signal was not derived from a source instruction within the subset, the address translation circuit 140 does not alter the pointer address signal but rather outputs the address signal at the translation outputs 144.

The address selection means 182 receives either the address signal or the mapped pointer address signal at the first inputs 184, and the address signal at its second inputs 186. Since the address signal was derived from a source instruction, the address selection means 180 receives the acknowledgment signal at its control input 182. Therefore, the signal present at the first inputs 186 is routed to the outputs 188 of the address selection means 180 and thereby placed upon the second address bus 105.

If the address signal has been altered by the address translation circuit 140 to form the mapped pointer address signal, the pointer to the next emulation routine is stored within the data cache 30, and the data cache 30 outputs the pointer on its data outputs 36. If the address signal has not been altered by the address translation circuit 140, the pointer to the next emulation routine is not stored in the data cache 30. In this case, the data cache 30 outputs a cache miss signal on its cache miss output 38. The cache miss signal is received by the RAM 50 at the enable input 54. Receipt of the cache miss signal allows the RAM 50 to output the pointer to the next emulation routine at its data outputs 58, thereby placing the pointer to the next emulation routine on the data bus 106. The CPU 12 receives the pointer to the next emulation routine at its data inputs 18.

Figure 3:
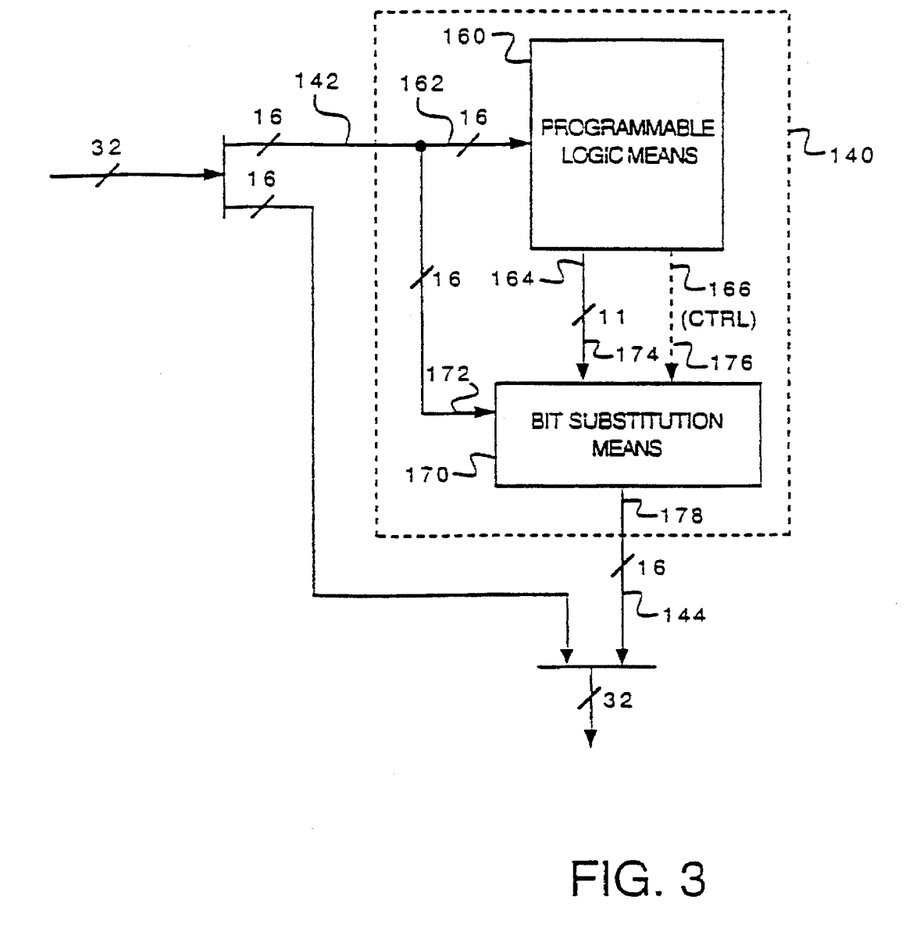
FIG. 3 is a block diagram of a preferred embodiment of an address translation circuit.

Referring now to FIG. 3, a preferred embodiment of the address translation circuit 140 is shown. The address translation circuit 140 comprises a programmable logic means 160 having a plurality of inputs 162, a plurality of outputs 164, and a control output 166; and a bit substitution means 170 having a plurality of first inputs 172, a plurality of second inputs 174, a control input 176, and a plurality of outputs 178. A subset of the translation inputs 142 of the address translation circuit 140 are coupled to the inputs 162 of the programmable logic means 160 and to the first inputs 172 of the bit substitution means 170. The outputs 164 of the programmable logic means 160 and control output 166 are coupled to the inputs 174 and control input 176 of the bit substitution means 170, respectively. The outputs 178 of the bit substitution means 170 are coupled to the outputs 144 of the address translation circuit.

In an exemplary CISC instruction set considered herein, 64,000 source instructions are present. Of these, 2,000 source instructions represent the subset of source instructions which are executed approximately 95% of the time (most frequently executed source instructions). Hence, 16 bits are required to uniquely specify an instruction within the source instruction set, while only 11 bits are required to uniquely specify a source instruction within the subset of most-frequently executed source instructions. Thus, each source instruction's opcode portion is 16 bits wide. In the preferred embodiment, signals present on either the first address bus 104 or the second address bus 105 are 32 bits wide. As a result, the address signal and the mapped pointer address signal are 32 bits wide, with 16 bits corresponding to the opcode of the source instruction from which it was created. Therefore, a first 16 bits of the address signal present at the translation address inputs 142 are routed into the inputs 162 of the programmable logic means 160 and into the second inputs 174 of the bit substitution means 170. The remaining 16 bits of the address signal present at the translation address inputs 142 bypass both the programmable logic means 160 and the bit substitution means 170.

The programmable logic means 160 recognizes whether the first 16 bits of the address signal correspond to a source instruction within the subset of most-frequently executed source instructions. In the event that the first 16 bits of the address signal correspond to a source instruction within the subset of most-frequently executed source instructions, the programmable logic means 160 produces a mapped address signal at its outputs 164 corresponding to the data cache address at which the pointer to the next emulation routine is stored. As the subset of most frequently executed source instructions spans only 11 bits, the mapped address signal and hence the programmable logic means outputs 164 comprise 11 bits. If the first 16 bits of the address signal received at the inputs 162 of the programmable logic means 160 do not correspond to a source instruction within the subset of most frequently executed source instructions, the mapped address signal present at the outputs 164 does not correspond to a valid data cache address. The programmable logic means 160 outputs a control signal at its control output 166 to indicate that whether or not a valid data cache mapping has occurred. In the preferred embodiment of the address translation circuit 140, the programmable logic means 160 is a programmable logic array (PLA). In an alternate embodiment, the programmable logic means 160 is reprogrammable, comprising an electrically-erasable programmable read-only memory (EEPROM). Use of an EEPROM allows refinements to the subset of most frequently executed source instructions to occur after the first programming. Those skilled in the art will recognize that the programmable logic means 160 can also comprise a RAM.

The second inputs 174 of the bit substitution means 170 receive the 11-bit mapped address signal produced at the outputs 164 of the programmable logic means 160. The bit substitution means 170 also receives the first 16 bits of the address signal at its first inputs 172. The control signal input 176 receives the control signal produced by the programmable logic means 160. The bit substitution means 170 selectively routes either the first 16 bits of the address signal present at the first inputs 172 or the 11-bit mapped address signal present at its second inputs 174 to its outputs 178 based upon the value of the control signal. If the control signal indicates that a valid data cache 30 mapping has not occurred, the first 16 bits of the address signal are routed to the bit substitution means outputs 178. At the output of the bit substitution means 170, the first 16 bits of the address signal and the remaining 16 bits of the address signal are combined into the original 32-bit pointer address signal in this case. If the control signal indicates that a valid data cache mapping has occurred, the 11-bit mapped address signal is routed to the outputs 178 of the bit substitution means 180. In the routing, 5 additional bits are conjoined with the 11-bit mapped address signal to produce a 16-bit data cache address signal, where the 5 additional bits are used to indicate a predefined base address within the data cache 30 at which the emulation routine pointers are stored. In a manner similar to the routing together of the first and second 16-bit signals at the outputs 178 of the bit substitution means 170, the 16-bit data cache address signal and the second 16-bit signal are combined to form the 32-bit mapped pointer address signal. In the preferred embodiment of the instruction mapping circuit 120, the bit substitution means 170 comprises a plurality of multiplexors.

When the next source instruction is within the subset of most-frequently executed source instructions, the mapped pointer address signal is a data cache 30 address containing the pointer to the next emulation routine. Otherwise, the pointer address signal is a RAM address. If the pointer is stored within the data cache 30, the pointer to the next emulation routine will be available to the interpretive emulator much more rapidly than if the pointer were stored in RAM 50. Without the instruction mapping circuit 120 of the present invention, a significant delay would occur in an interpretive emulation environment between the dispatch loop's indexing of a memory table containing emulation routine pointers and the return of the appropriate pointer to the dispatch loop. As emulation routines are unlikely to be executed in sequence due to an essentially random mix of source instructions within the source instruction program, their corresponding pointers exhibit no address coherence. Thus, even if emulation routine pointers are cached, an emulator functioning without the instruction mapping system 2 of the present invention will not realize a significant performance enhancement. Use of the instruction mapping system 2 of the present invention in an interpretive emulation environment greatly reduces the time required to obtain the pointer to a given emulation routine. This enhanced emulation performance is achieved because the instruction mapping circuit 120 of the present invention exploits an emulated instruction set's execution coherence.

Figure 4:
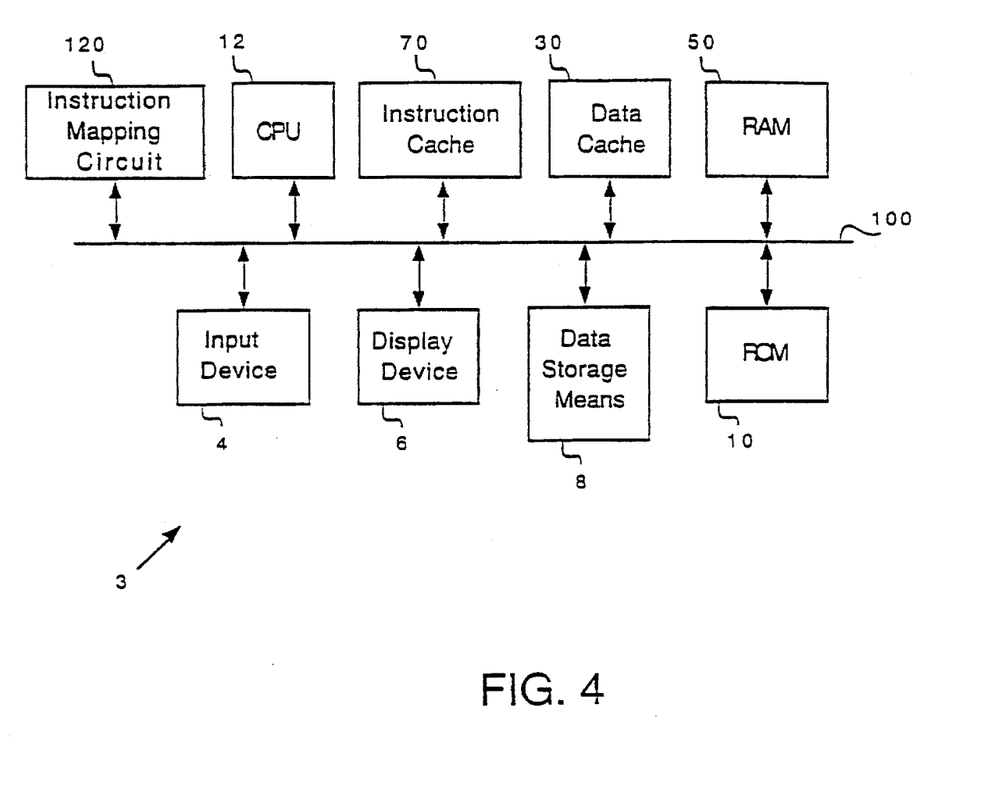
FIG. 4 is a block diagram of a second embodiment of the instruction mapping system constructed in accordance with the present invention.

Referring now to FIG. 4, a block diagram of a second embodiment of the instruction mapping system 3 of the present invention is shown. The second embodiment 3 comprises the elements of the preferred embodiment, and also includes an instruction cache 70, where the instruction cache 70 contains host instructions. A predefined set of addresses within the instruction cache 70 contains a plurality of next emulation routine jump instructions, where each next emulation routine jump instruction contains a jump opcode portion and a pointer to an emulation routine corresponding to a source instruction within the subset of most-frequently executed source instructions. The next emulation routine jump instructions corresponding to the source instruction set are preferably stored in RAM 50.

Figure 5:
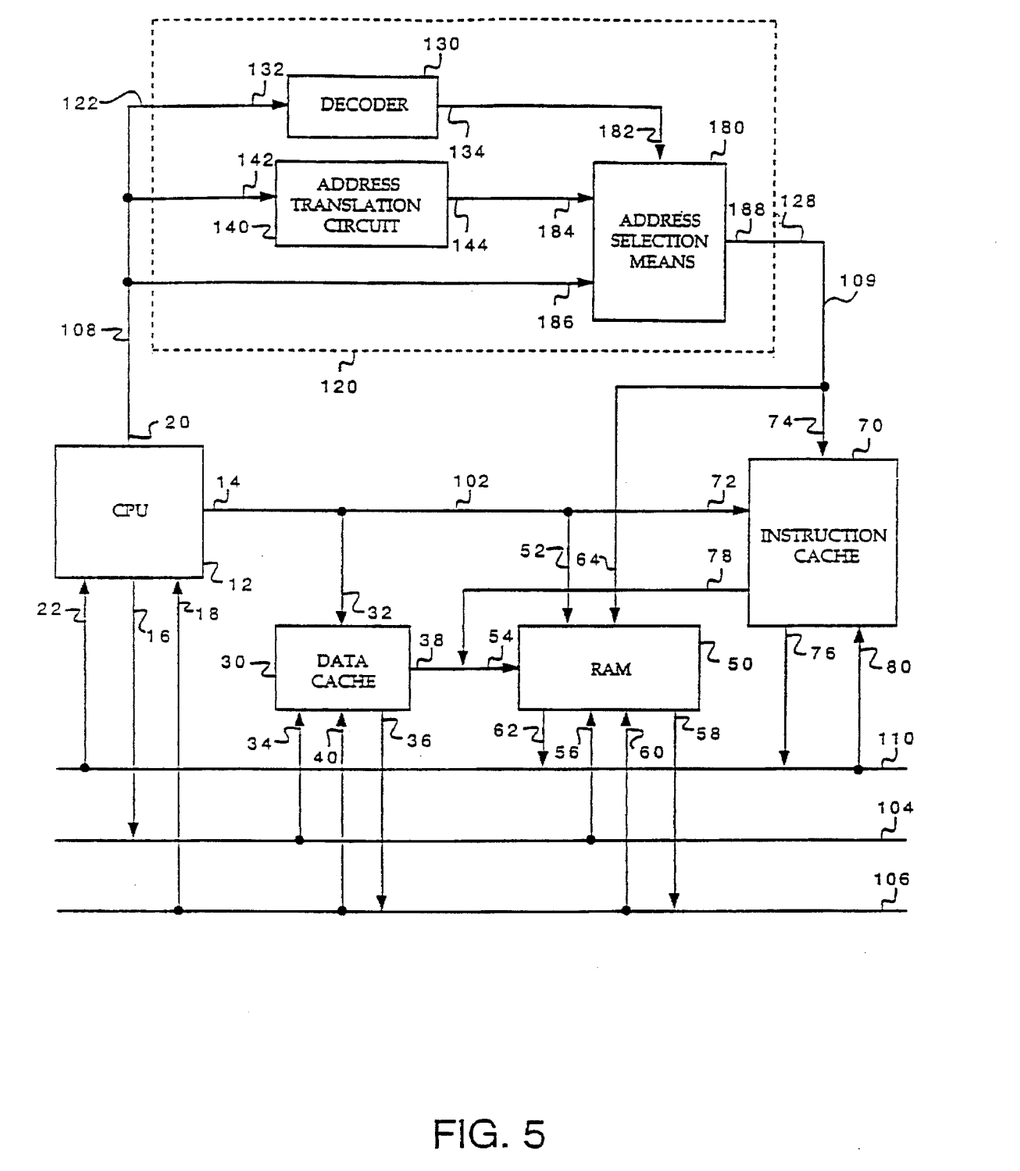
FIG. 5 is a block diagram showing further details of the second embodiment of the instruction mapping circuit of the present invention.

Referring now to FIG. 5, a block diagram showing further details of the second embodiment 3 of the instruction mapping system of the present invention is shown. Like reference numbers are used for like elements in FIG. 2 and FIG. 5. The instruction mapping system 3 of the second embodiment comprises the elements of the preferred embodiment, as well as, the instruction cache 70, a first instruction address bus 108, a second instruction address bus 109, and an instruction bus 110. In the second embodiment, the CPU 12 further includes a plurality of instruction address outputs 20 and a plurality of instruction inputs 22. The instruction address outputs 20 are coupled to the first instruction address bus 108, and the CPU instruction inputs 22 are coupled to the instruction bus 110. During a program's execution, the CPU 12 fetches host instructions from memory 50. In the host instruction fetch, the CPU 12 places an instruction address signal on the first instruction address bus 108. The host instruction stored at the instruction address is returned to the CPU 12 via the instruction bus 110, after which the CPU 12 loads the host instruction present at its instruction inputs 22.

In the second embodiment of the instruction mapping system 3, the RAM 50 includes a plurality of instruction outputs 62 that are coupled to the instruction bus 110. Host instructions that are not stored within the instruction cache 70 are stored in RAM 50, and can be output to the instruction bus 110 upon receipt of an appropriate control signal. The RAM 50 also stores a next emulation routine jump instruction for each source instruction within the source instruction set.

The instruction cache 70 preferably comprises a high-speed memory having a plurality of control inputs 72, a plurality of instruction address inputs 74, a plurality of instruction outputs 76, a cache miss output 78, and a plurality of instruction inputs 80. The control inputs 72 are coupled to the control bus 102, the instruction address inputs 72 are coupled to the second instruction address bus 109, and the instruction outputs 76 and instruction inputs 80 are coupled to the instruction bus 110. The cache miss output 78 is coupled to the enable input 54 of the RAM 50. The instruction address cache 70 receives an instruction address signal present upon the second instruction address bus 109. If the instruction address signal present upon the second instruction address bus 109 corresponds to an instruction address present within the instruction cache 70, the host instruction stored at the address indicated by the instruction address signal is output at the instruction cache's instruction outputs 76. If the instruction address signal does not correspond to an address present within the cache 70, the instruction cache 70 outputs a cache miss signal at its cache miss output 78, thereby allowing the RAM 50 to transfer the instruction stored at the address indicated by the instruction address signal to its instruction outputs 62.

In the second embodiment of the instruction mapping system 3, the address inputs 122 of the instruction mapping circuit 120 are coupled to the first instruction address bus 108, and the instruction mapping circuit outputs 128 are coupled to the second instruction address bus 109. The instruction mapping circuit 120 receives an instruction address signal at its address inputs 122, and determines if the instruction address signal is a next emulation routine jump instruction address. If so, the instruction mapping circuit 120 determines whether the next emulation routine jump instruction address was derived from a source instruction within the subset of most frequently executed source instructions. If not the next emulation routine jump instruction address is routed to the instruction mapping circuit outputs 128. If the next emulation routine jump instruction address was derived from a source instruction within the subset the instruction mapping circuit 120 maps the next emulation routine jump instruction address to a predefined instruction cache 70 address. In the event that the instruction address received is not a next emulation routine jump instruction address, the instruction address received is routed to the instruction mapping circuit outputs 128 unaltered.

The details pertaining to the treatment of a next emulation routine jump instruction address in the second embodiment 3 of the present invention are described in the following paragraphs. In the second embodiment 3 of the present invention, the CPU 12 places a host instruction address upon the first instruction address bus 108 during the execution of each host instruction within the current emulation routine. After the current emulation routine's execution has completed, the CPU 12 issues a fetch command to retrieve the next source instruction. As in the preferred embodiment, the data cache 30 is the most probable location of the next source instruction. After the next source instruction has been loaded into the CPU 12, the CPU 12 extracts the opcode portion of the next source instruction, and performs one or more operations upon the opcode portion in order to create a next emulation routine jump instruction address. The operations preferably comprise a logical masking step and one or more shifts. The CPU 12 outputs the next emulation routine jump instruction address on the first instruction address bus 108.

Within the instruction mapping circuit 120, the decoder 130 determines if the signal received at its inputs 132 is a next emulation routine jump instruction address. If so, the decoder generates an acknowledgment signal at its output 134. The address translation circuit 140 also receives the signal present at its translation inputs 142, and determines whether the signal received is a next emulation routine jump instruction address derived from a source instruction within the subset of most frequently executed source instructions. If so, the address translation circuit 140 maps the next emulation routine jump instruction address to a predefined instruction cache 70 address, thereby creating a mapped next emulation routine jump instruction address at its translation outputs 144. If the next emulation routine jump instruction was not derived from a source instruction within the subset, the next emulation routine jump instruction is routed to the translation outputs 144 unaltered.

The address selection means 180 receives the acknowledgment signal at its control input 182, and routes the signal present at the translation outputs 144 to the second instruction bus 109. The instruction cache 70 and the RAM receive either the next emulation routine jump instruction signal or the mapped next emulation routine jump instruction signal. If the mapped next emulation routine jump instruction signal is received, the instruction cache 70 contains the next emulation routine jump instruction. The next emulation routine jump instruction is then routed to the instruction bus 110 via the instruction outputs 76 of the instruction cache 70. In the event that the next emulation routine jump instruction is received, the instruction cache 70 outputs a cache miss signal at its cache miss output 78. This in turn allows the RAM 50 to output the next emulation routine jump instruction to the instruction bus 110 via its instruction outputs 64.

Figure 6:
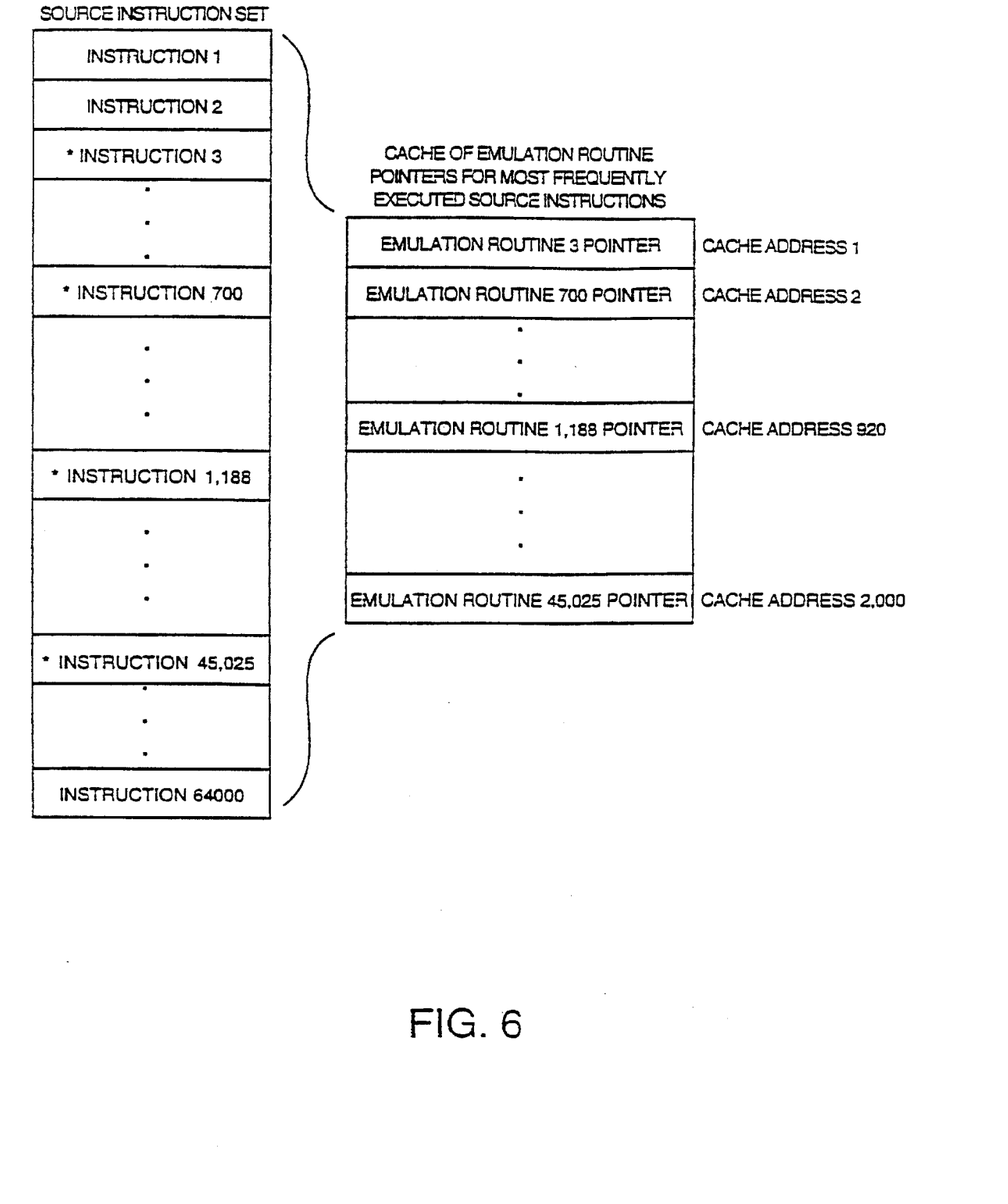
FIG. 6 is a diagram indicating an exemplary mapping of source instructions within a subset of most frequently executed instructions to corresponding cache addresses.

Referring now to FIG. 6, a diagram indicating an exemplary mapping of source instructions to a set of data cache 30 addresses containing pointers to corresponding emulation routines is shown. Each source instruction mapped to a corresponding data cache 30 address lies within the subset of most frequently executed source instructions of the source instruction set. Instructions within the subset are indicated with an asterisk in the figure. Instructions 3, 700, 1188, and 45025 are mapped to pointer cache addresses 1, 2, 920, and 2000, respectively, as shown. In an exemplary emulation situation, if the CPU 12 receives source instruction 3, the CPU 12 outputs a pointer address signal derived from the opcode portion of source instruction 3. Next, the decoder receives the pointer address signal, and outputs the acknowledgment signal. The programmable logic means 160 receives the subset of bits within the pointer address signal that span the set of emulation routine pointers. Since the pointer address signal was derived from a source instruction within the subset of most frequently executed source instructions, the programmable logic means 160 maps the pointer address signal to data cache 30 address 1 and outputs the mapped address signal. The programmable logic means 160 also outputs its control signal indicating that the mapping was valid. The bit substitution means 170 creates the mapped pointer address signal from the mapped address signal, and outputs the mapped pointer address signal. The signal selection means 180 receives the acknowledgment signal from the decoder 130, and routes the mapped pointer address signal to the second address bus 105. As the mapped pointer address signal corresponds to data cache address 1, the data cache 30 outputs the pointer to emulation routine 3 stored at data cache address 1 to the data bus 106.

Figure 7:
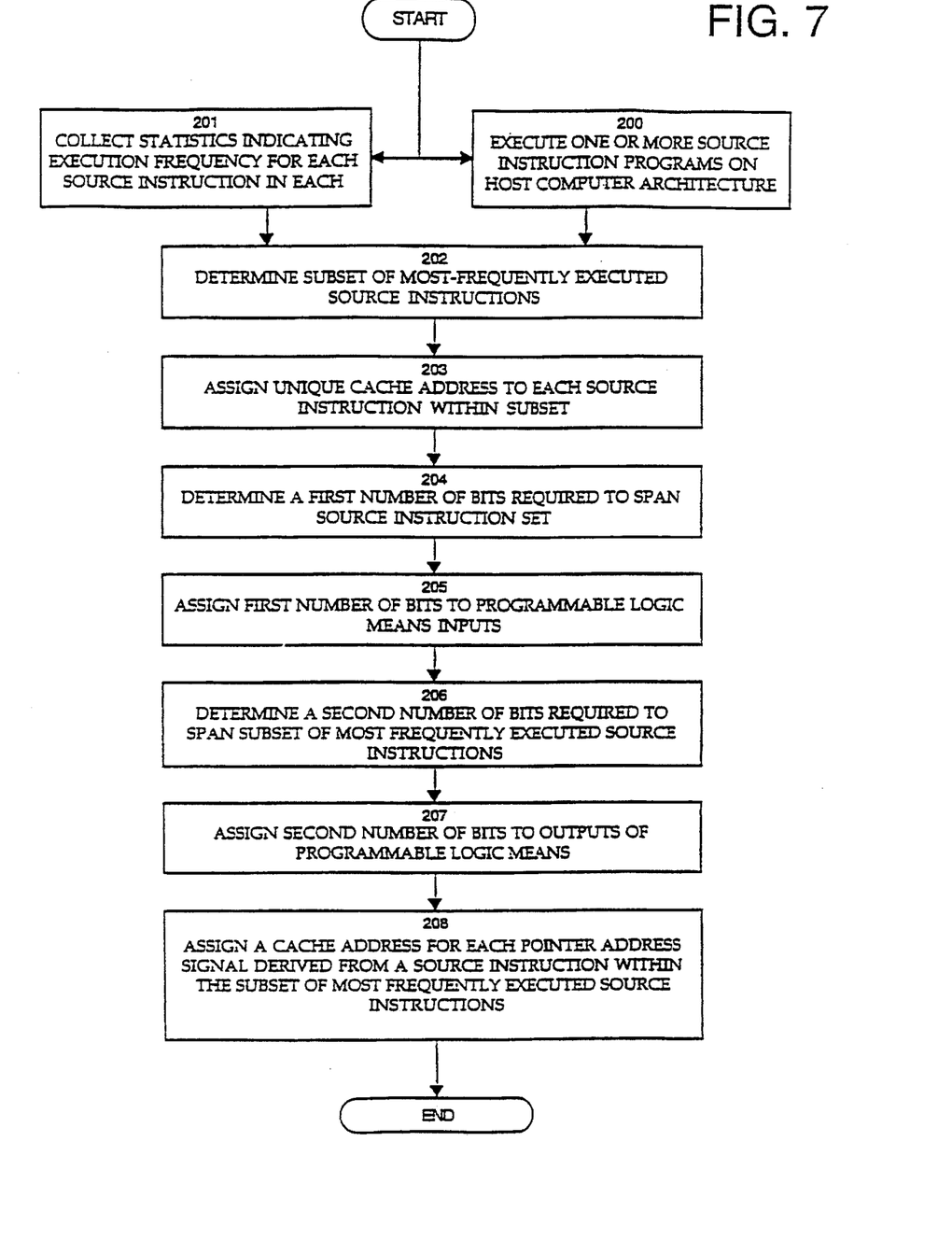
FIG. 7 is a flowchart of a preferred method for making the instruction mapping system of the present invention.

Referring now to FIG. 7, a flowchart of a preferred method for manufacturing the preferred embodiment of the instruction mapping system 2 of the present invention is shown. The method begins in step 200, with execution of at least one and preferably several source instruction programs. As each programs is run in step 200, statistics indicating the relative execution frequency of each instruction within each program are collected in step 201. In the preferred method, steps 200 and 201 are performed using the host computer system. The statistics are then maintained by one or more host instructions within each given emulation routine that increment a corresponding counter. Thus, in the preferred method, each source instruction program is emulated in step 200 without the benefit of using the instruction mapping system of the present invention. While the emulation will be much slower than after the instruction mapping system has been manufactured, the simplicity of collecting the statistics in this manner is readily apparent. In an alternate method, each source instruction program could be executed upon the source computer system; however, this would require additional specialized software or hardware for the collection of source instruction execution frequency statistics. Next, in step 202, a subset of most-frequently executed source instructions is determined by examining the statistics resulting from step 201. In step 203, each source instruction within the subset is assigned or "mapped" to a data cache address, where the contents of the data cache address contain a pointer to an appropriate emulation routine. The assignment of each source instruction within the subset to a specific data cache address can generally be done without regard to any particular criteria. The most significant emulation performance gain is achieved as a result of collecting the randomly distributed source instructions having highest execution frequency from within the source instruction set and mapping each of them to a much smaller linear address space, not as a result of any particular ordering of the mapping. In step 204, a first number of bits required to span the entire source instruction set is determined, after which the first number of bits is assigned to the programmable logic means inputs 162 in step 205. The method continues in step 206, with a determination of a second number of bits required to span the subset of most frequently executed source instructions, after which the second number of bits is assigned to the programmable logic means outputs 164 in step 207. The final step of the method is step 208, in which the programmable logic means 160 is programmed such that a data cache address is associated with each source instruction within the subset.

If the programmable logic means within the instruction mapping circuit of the present invention is reprogrammable, the method indicated in FIG. 5 can be repeated without steps 204 through 207 to refine the subset of most frequently executed instructions and their corresponding cache addresses. This allows the subset to be further determined as the instruction mapping circuit is used.

Those skilled in the art will recognize that a method similar to that in steps 200 through 208 can be applied to the manufacturing of an alternate embodiment of the present invention.

While the instruction mapping system and the method for manufacturing the instruction mapping system have each been described with reference to a certain preferred embodiments, those skilled in the art will recognize that various modifications may be provided. These and other variations upon and modifications to the preferred embodiments are provided for by the present invention which is limited only by the following claims.

What is claimed is:

1. An address selective address mapping system for a host computer system having a central processing unit (CPU) having data inputs and address outputs, and a memory having address inputs and data outputs, the data inputs of said CPU and the data outputs of said memory coupled to a data bus, the address selective address mapping system for selectively mapping a memory address output by said CPU to a cache address, the memory address and the cache address each storing a pointer to an emulation routine, the address selective address mapping system comprising:

a cache having address inputs, data inputs, and data outputs, for storing a plurality of pointers, each pointer corresponding to an emulation routine, the data inputs and data outputs of said cache coupled to said data bus;

a decoder having inputs and an output for controlling whether the address from the CPU is translated to a cache address by determining whether the address received corresponds to an address at which a pointer to an emulation routine pointer for a source instruction within a source instruction set is stored, the inputs of said decoder coupled to receive an address signal from said CPU;

an address translation circuit having inputs and outputs for determining whether an address received from said CPU corresponds to an instruction that has pointer stored in the cache, the inputs of the address translation circuit coupled to receive an entire address signal from said CPU; and     an address selection means having a control input, first data inputs, second data inputs and outputs, the address selection means generating an address for said memory and said cache by selectively outputting the signals from the first data inputs and the second data inputs, the control input of said address selection means coupled to the output of said decoder, the first data inputs coupled to the outputs of said address translation circuit, the second data inputs coupled to receive an entire address signal from said CPU, and the outputs of said address selection means coupled to the address inputs of said cache and the address inputs of said memory.

2. The address selective address mapping system of claim 1, wherein said address translation circuit translates a plurality of the memory address to cache addresses, and wherein each memory address translated corresponds to a source instruction belonging to a subset of most frequently used source instructions within a source instruction set.

3. The address selective address mapping system of claim 2, wherein a portion of said cache is reserved for storing a plurality of pointers to emulation routines corresponding to the subset of most frequently used source instructions, and wherein said address translation circuit translates the plurality of memory addresses to corresponding cache addresses in the reserved portion of said cache.

4. The address selective address mapping system of claim 3, wherein the reserved portion of said cache stores about 2000 pointers to emulation routines.

5. The address selective address mapping system of claim 1, wherein the output of said decoder is asserted if the address signal from said CPU received on the inputs of said decoder corresponds to an address for a pointer to an emulation routine for a source instruction.

6. The address selective address mapping system of claim 1, wherein said address translation circuit comprises a means for determining whether the address signal from said CPU corresponds to an address of an emulation routine pointer within a subset of most frequently executed source instructions from the source instruction set, and altering bits in the address signal such that the altered address signal corresponds to a predefined cache address, if the address signal corresponds to an address of an emulation routine pointer.

7. The address selective address mapping system of claim 1, wherein said address translation circuit comprises:

a programmable logic means having inputs, data outputs, and a control output for recognizing whether the address signal corresponds to a source instruction within the subset of most-frequently used source instructions, for mapping the address signal to a corresponding cache address and for determining whether the cache address is valid, the inputs of said programmable logic means coupled to receive the address signal from said CPU; and     a bit substitution means having a first set of inputs, a second set of inputs, a control input, and a plurality of outputs for selectively routing one from the group of the address signal and a mapped address signal, and conjoining a plurality of bits to form the mapped address signal, the first set of inputs coupled to the outputs of said programmable logic means, the second set of inputs coupled to receive the address signal from said CPU, the control input of said bit substitution means coupled to the control output of said programmable logic means.

8. The address selective address mapping system of claim 6, wherein said programmable logic means is a programmable logic array.

9. The address selective address mapping system of claim 6, wherein said programmable logic means is reprogrammable.

10. The address selective address mapping system of claim 6, wherein said programmable logic means is an EPROM.

11. An address selective address mapping system for a host computer system having a central processing unit (CPU) having data inputs and instruction address outputs, and a memory having instruction address inputs and data outputs, the data inputs of said CPU and the data outputs of said memory coupled to a data bus and an instruction bus, the address selective address mapping system for selectively mapping a memory address output by said CPU to a cache address, the memory address and the cache address each containing a pointer to an emulation routine, the address selective address mapping system comprising:

an instruction mapping circuit having inputs and outputs for receiving and selectively translating the memory address into a corresponding cache address, the inputs of the instruction mapping circuit coupled to instruction address outputs of the CPU and the outputs of the instruction mapping circuit coupled to instruction address inputs of the memory;]

an instruction cache having control inputs, address inputs and data inputs and data outputs for storing a plurality of pointers, each pointer corresponding to an emulation routine, the data inputs and data outputs of said instruction cache coupled to an instruction bus, and the address inputs of the instruction cache coupled to an instruction bus;

a data cache having address inputs, data inputs and data outputs for storing data, the data inputs and data outputs of said data cache coupled to said data bus, and the address inputs of said data cache coupled to a data address bus;

a decoder having inputs and an output for controlling whether an address received from said CPU is subject to being translated to an instruction cache address by determining whether the address received corresponds to an address at which a pointer to an emulation routine for a source instruction is stored, the inputs of said decoder coupled to receive an address signal from said CPU;

an address translation circuit having inputs and outputs for determining whether the address received corresponds to a source instruction that has a corresponding pointer to an emulation routine stored in said instruction cache, the inputs of said address translation circuit coupled to receive an entire address signal from said CPU; and an address selection means having a control input, first data inputs, second data inputs and outputs, said address selection means receiving signals at the first data inputs and the second data inputs and selectively outputting the signals from the first data inputs and the second data inputs, the control input of said address selection means coupled to the output of said decoder, the first data inputs coupled to the outputs of said address translation circuit, the second data inputs coupled to receive an entire address signal from said CPU, and the outputs of said address selection means coupled to the address inputs of said instruction cache and the address inputs of said memory.

12. The address selective address mapping system of claim 11, wherein a portion of said instruction cache is reserved for storing a plurality of pointers to emulation routines, each pointer stored in the reserved portion of said instruction cache corresponding to a source instruction within a subset of most frequently used source instructions in a source instruction set, and wherein said address translation circuit translates a plurality of memory addresses to corresponding instruction cache addresses in the reserved portion of said instruction cache.

13. The address selective address mapping system of claim 11, wherein said address translation circuit comprises:

a programmable logic means having inputs, data outputs, and a control output for recognizing whether the address signal corresponds to a source instruction within the subset of most-frequently used source instructions, for mapping the address signal to a corresponding instruction cache address and determining whether the instruction cache address is valid, the inputs of said programmable logic means coupled to receive the address signal from said CPU; and a bit substitution means having a first set of inputs, a second set of inputs, a control input, and a plurality of outputs for selectively routing one from the group of the address signal and a mapped address signal, and conjoining a plurality of bits to form the mapped address signal, the first set of inputs coupled to the outputs of said programmable logic means, the second set of inputs coupled to receive the address signal from said CPU, the control input of said bit substitution means coupled to the control output of said programmable logic means.

14. An address selective address mapping circuit for receiving and selectively translating a memory address into a corresponding cache address, the address selective address mapping circuit comprising:

a decoder having inputs and an output for controlling whether an address received from a CPU is subject to being translated to a cache address by determining whether the address received corresponds to an address at which a pointer to an emulation routine for a source instruction within a source instruction set is stored, the inputs of said decoder coupled to receive an address signal from said CPU;

an address translation circuit having inputs and outputs for determining whether the address received corresponds to a source instruction that has a corresponding pointer to an emulation routine stored in a cache, the inputs of said address translation circuit coupled to receive an entire address signal from said CPU; and an address selection means having a control input, first data inputs, second data inputs and outputs, said address selection means receiving signals at the first data inputs and the second data inputs and selectively outputting the signals from the first data inputs and the second data inputs, the control input of said address selection means coupled to the output of said decoder, the first data inputs coupled to the outputs of said address translation circuit, the second data inputs coupled to receive an entire address signal from said CPU, and the outputs of said address selection means coupled to the address inputs of said cache and the address inputs of a memory.

* * * * *